Figure 1:
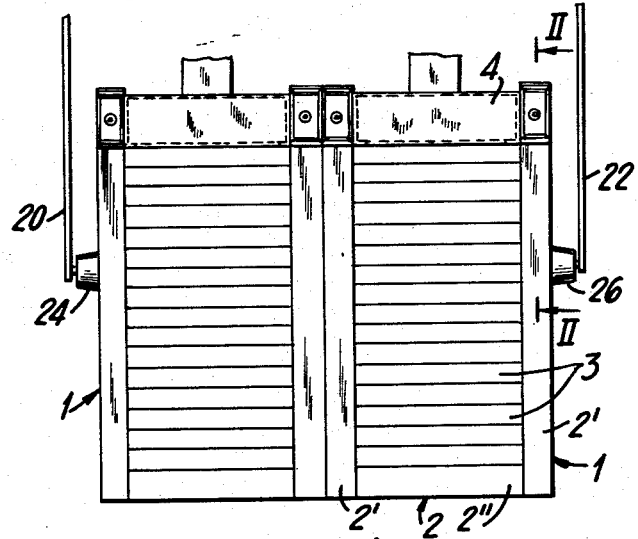

June 22, 1965      A. KELLER      3,190,216

APPARATUS FOR PRESSING A SERIES OF STACKED ARTICLES

Filed April 1, 1964      2 Sheets-Sheet 1

INVENTOR.
ALOIS KELLER

BY

McGlew & Toren
ATTORNEYS.

INVENTOR.
ALOIS KELLER 3,190,216
APPARATUS FOR PRESSING A SERIES OF STACKED ARTICLES
Alois Keller, Bischofszell, Thurgau, Switzerland, assignor to Gebruder Buhler, Uzwil, Sankt Gallen, Switzerland
Filed Apr. 1, 1964, Ser. No. 356,623
Claims priority, application Switzerland, May 21, 1963, 6,335/63
9 Claims. (Cl. 100—289)

This invention relates in general to stack pressing or gripping devices, and in particular to a new and useful device for supporting a stack of articles such as riddles or sieve frames under pressure.

The present invention has particular relationship to a frame for supporting riddles in a vertical stack with means for maintaining the stack under pressure. A disadvantage in the known devices of this type is that the pressure exerted on the stack is not distributed uniformly.

In accordance with the present invention there is provided a frame construction for supporting a plurality of riddles in a vertical stack with a pressure member on the top or one end of the frame which may be moved downwardly to maintain the stack under pressure. The construction includes means for supporting a threaded spindle in a manner permitting its axial movement. The pressure member is displaceable in the frame on spindle nut supports which are in threaded engagement at spaced locations with the spindle and which are axially displaceable upon rotation of the spindle. The spindle nuts brace the pressure member through engagement by a bearing portion of each spindle nut which is engaged in a respective one of a pair of oppositely inclined oblique slots formed on the pressure member. Rotation of the spindle in one direction is effective to displace the spindle nuts outwardly in opposite directions to cause the advance of the bearing portions in the respective oblique slots and the downward even movement of the pressure member on the sieve frames. Since the spindle on which the spindle nuts are guided is axially displaceable, the downward pressurizing force exerted by the pressure member on the sieve stacks is uniformly distributed, even if there are slight differences in the heights of each end of the stacks. When the spindle is rotated in an opposite direction, the spindles move together to relieve the pressure on the riddles.

Accordingly, it is an object of this invention to provide a device for supporting and maintaining uniform downward pressure on a vertical stack of articles such as riddles.

A further object of the invention is to provide a device for supporting a plurality of stacks of articles such as riddles in a frame which includes a pressure member supported on the frame and displaceable into engagement with the stacks for pressurizing the same with substantially uniform pressure over the entire area of the riddles.

A further object of the invention is to provide a device for supporting a stack of riddles which includes a pressure member carried by bearing projections of spindle nuts which engage in oblique form in diverging manner on the pressure member, and wherein the spindle nuts are displaceable axially on the spindle member to cause the bearing projections engaged in the oblique slots to effect a vertical displacement of the pressure member; the construction being characterized by the supporting of the spindle in the frame in a manner permitting the axial displacement of the spindle against a biasing force.

A further object of the invention is to provide a device for holding articles under pressure which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 4:
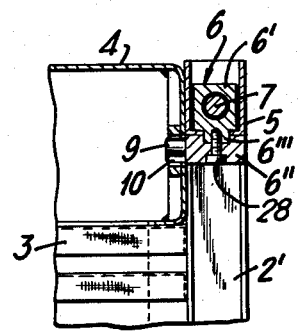
Figure 2:
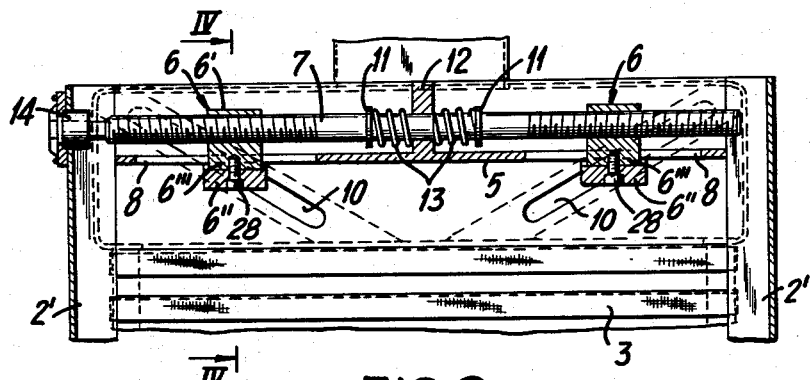
Figure 3:
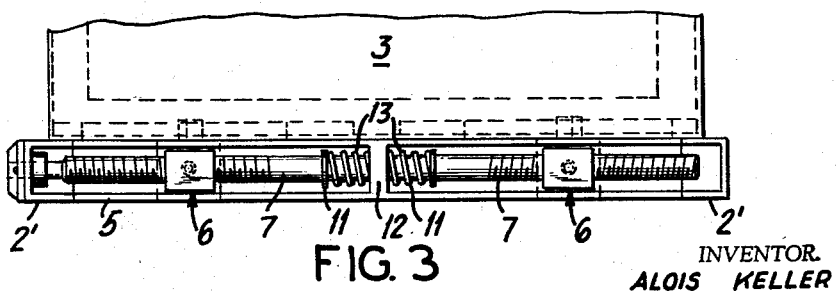
Figure 5:
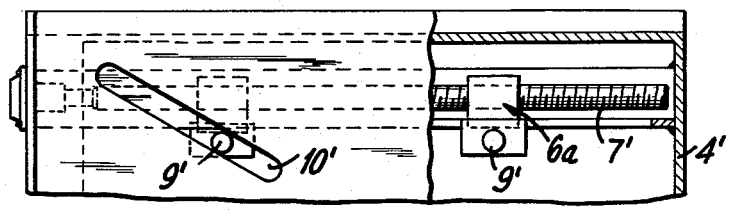
Figure 6:
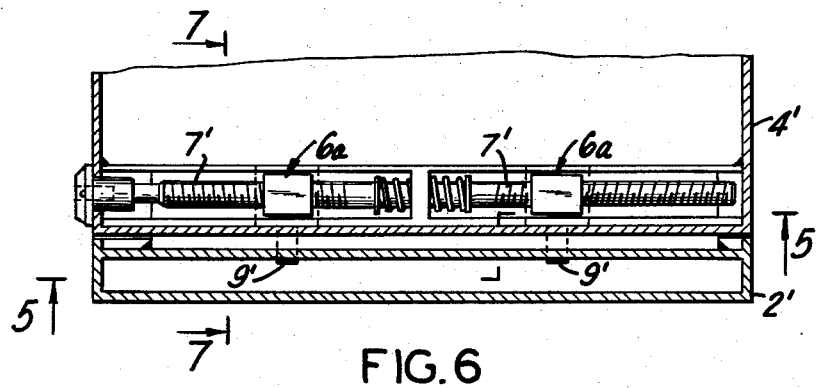
Figure 7:
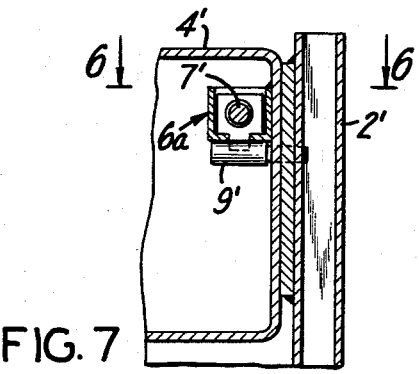

In the drawings:
FIG. 1 is a side elevational view of a pair of riddle holding devices constructed in accordance with the invention;
FIG. 2 is a partial section taken on the line II—II of FIG. 1;
FIG. 3 is a partial top plan view of the device indicated in FIG. 1;
FIG 4 is a fragmentary section taken on the line IV—IV of FIG. 2;
FIG. 5 is a section taken on the line 5—5 of FIG. 6 of another embodiment of the inventiion;
FIG. 6 is a section taken on the line 6—6 of FIG. 7 of the embodiment of FIG. 5; and
FIG. 7 is a section taken on the line 7—7 of FIG. 6.

Referring to the drawings in particular, the invention embodied therein comprises two pressure frame or riddle holding devices generally designated 1 arranged side by side in a position engaged by arms 20 and 22 having engaging portions 24 and 26, respectively.

In accordance with the invention, each pressure device 1 includes a frame generally designated 2 having upright side frame elements 2', 2' connected by a bottom frame element 2''. The frame or stand 2 supports a stack of riddles 3 which are braced by a pressure element or frame 4.

As best indicated in FIG. 4, each of the frame elements 2' has a substantially U-shaped cross section rail portion 5 which provids a guide for two identical spindle nuts generally designated 6. Each spindle nut 6 includes an upper substantially rectangular or block-shaped portion 6' and a lower extension 6'' arranged below the rail portion 5 which is connected to the upper portion 6' by means of a neck portion or extension 6'''. The portion 6'' is connected to the extension 6''' by means of a bolt 28 which permits removal or assembly of the spindle nuts around the rail portion 5 of the frame piece 2', as desired. The extension portion 6''' extends through an axially elongated or oblong slot 8 of the rail portion 5.

As indicated in FIG. 2, two spindle nuts 6 are provided within slots 8, 8 arranged at longitudinally spaced locations along the length of the frame 2. Each spindle nut 6 includes a laterally extending journal or pin 9 which engages a trackway 10 defined by oblique slots cut or formed in the pressure member or frame 4. The slots 10 are inclined in opposite directions, diverging outwardly toward each end of the frame 2.

Rotatably supported in the frame 2 on an intermediate upright portion 12 and in each of the frame elements 2', 2' is a spindle 7. The spindle 7 is supported in a manner permitting its slight axial movement and it is provided with threads in threaded engagement with internal threads of the spindle nuts 6, 6. Rotation of the spindle 7 causes axial displacement of the spindle nuts 6, 6 along the spindle in opposite axial directions. Springs 13, 13 are arranged between the intermediate frame portion 12 and stops 11, 11 on the spindle 7 and bias the spindle against axial displacement in either direction. The spindle 7 is supported, however, so that it may be displaced against such biasing means when subjected to a sufficient axial force. The spindle 7 is connected such as by a coupling 14 which is journalled on the frame element 2' of the stand 2 to permit a crank member to be inserted into the coupling and connected to the spindle to permit rotation thereof.

When the spindle 7 is rotated to move the spindle nuts 6, 6 in outward opposite directions, the frame 4 is displaced downwardly to bear against the stack of riddles 3 and exert a downward pressure thereon. Since the spindle 7 may move axially against the force of the springs 13, 13, the spindle adjusts itself so that the equal bracing forces are exerted by the spindle nuts 6, 6 through the pressure frame 4 and on the stacks 3. Differences in the heights of the stacks caused by slight differences of each of the individual riddles 3 are thus automatically compensated. This is so because each spindle nut 6 or its respective journal 9 may move along the track 10 and both nuts are movable along with the spindle 7. The pressure exerted on the stacks will be uniform and no bending or tensile forces will be set up.

It should be appreciated that without departing from the principles of the invention, it is sometimes desirable to arrange the spindle 7 with the nuts 6, 6 located in a moving pressure frame 4 and to provide the inclined tracks 10 in the rail 5 of the frame 2. In FIGS. 5 to 7 the spindle 7' is rotatably mounted on a moving frame 4' which moves relatively to a fixed frame 2'. The moving frame 4' carries inclined slots 10', 10' in which nuts 6a, 6a are guided through projection 9'.

The frame 2 is wide open on each side so that easy access to each of the riddles 3 is provided.

While specific embodiments of the invention have been shown and described in detail to illustrate the application of the inventive principles, it will be understood that the invention may be embodied otherwise without departing from such principles.

What is claimed is:

1. A pressure applying device for a stack of articles such as riddles, comprising a frame, a spindle rotatably supported by said frame and axially displaceable thereon, at least two spindle nuts threadably engaged with said spindle at spaced locations, a pressure member movable in two directions for pressing a stack of articles carried in said frame, said pressure member having oblique slot trackways defined therein which extend in opposite directions upwardly toward each end of said pressure member from the central portion thereof, each spindle nut including a bearing portion extending into said oblique trackway for supporting said pressure member and for effecting the transmission of downward pressure therethrough, said spindle being rotatable to displace said spindle nuts in opposite directions outwardly for moving said pressure member downwardly into pressure engagement with a stack of articles in the frame and inwardly toward each other for relieving pressure on the articles and permitting upward vertical displacement of said pressure member.

2. A device according to claim 1, including means for guiding said spindle nuts for movement parallel to said spindle arranged alongside said spindle.

3. A device according to claim 1, including a guide portion formed in said frame extending substantially parallel to said spindle including a member having an elongated slot, said spindle nuts including an extension portion extending through said slot and a portion exteriorly of said slot being wider than said slot.

4. A device according to claim 3, wherein the portions of said spindle nuts extending exteriorly of said guide member comprise a separate part detachably connected to the remaining portion of the respective one of said spindle nuts.

5. A device according to claim 1, including means to bias said spindle against axial movement.

6. A device for compressing a plurality of stacked articles under pressure, comprising a frame for the articles, a pressure member of substantially the same dimensions as the articles to be compressed, a rotatable threaded spindle, means supporting said spindle for axial and rotatable movement, at least two spindle nuts carried by said spindle at spaced locations and threadably engaged therewith and being axially displaceable in opposite directions upon rotation of said spindle, means defining a pair of oppositely inclined diverging oblique trackways connected between said spindle nuts and said pressure member, said spindle nuts each having a portion engaged in a respective one of said oblique trackways, the construction being such that opposite movement of said spindle nuts in outwardly directions caused by rotation of said spindle causes said spindle nuts to bear downwardly through said slots on said pressure member to displace said member downwardly onto the articles in the stack and movement of said spindle nuts together, and rotation of said spindle in an opposite direction causes upward movement of said pressure member for relieving the pressure on the articles in the stack, said spindle being axially displaceable upon applying pressure on said pressure member whereby pressure is applied evenly over the articles to be stacked.

7. A device for compressing a plurality of stacked articles under pressure, comprising a frame for the articles, a pressure member of substantially the same dimensions as the articles to be compressed, a rotatable threaded spindle rotatably supported in said frame for axial movement, at least two spindle nuts carried by said spindle and threadably engaged therewith and being axially displaceable in opposite directions upon rotation of said spindle, means defining oblique trackways between said spindle nuts and said pressure member, said spindle nuts having a portion engaged in said oblique trackways, said oblique trackways being inclined in opposite directions and said spindle nuts being axially spaced apart, the construction being such that opposite movement of said spindle nuts in outwardly directions caused by rotation of said spindle in one direction causes said spindle nuts to bear downwardly through said slot on said pressure member to displace said member downwardly onto the articles in the stack, and movement of said spindle nuts together by rotation of said spindle in an opposite direction causes upward movement of said pressure member for relieving the pressure on the articles in the stack, said spindle being displaceable upon applying pressure on said pressure member whereby pressure is applied evenly over the articles to be stacked, said frame including a plate forming a guide arranged substantially parallel to said spindle and having a slot in alignment with each of said spindle nuts, said spindle nuts extending through said slot and being guided by said member.

8. A pressure applying device comprising a frame for supporting articles such as riddles in a vertical stack, a spindle rotatably supported on a side of said frame for rotation and axial movement, means to bias said spindle against axial movement, at least two spindle nuts threadably engaged with said spindle and being spaced apart longitudinally, each of said spindle nuts having a journal portion projecting laterally outwardly therefrom into said frame, a pressure member of substantially the same dimension as said frame adapted to be displaced vertically for pressure engagement with articles stacked into said member, said pressure frame having oblong slots defined therein extending obliquely outwardly in opposite directions toward respective ends of said member, said spindle nuts having respective bearing portions in respective ones of said slots, said spindle being rotatable to displace said spindle nuts in opposite directions outwardly for causing downward movement of said pressure member into engagement with the articles stacked in said frame for holding said articles under pressure.

9. A pressure applying device comprising a frame for supporting articles such as riddles in a vertical stack, a spindle rotatably supported on a side of said frame for rotation and axial movement, means to bias said spindle against axial movement, at least two spindle nuts threadably engaged with said spindle and being spaced apart longitudinally, each of said spindle nuts having a journal portion projecting laterally outwardly therefrom into said frame, a pressure member of substantially the same dimension as said frame adapted to be displaced vertically for pressure engagement with articles stacked into said frame, said pressure member having oblong slots defined therein extending obliquely outwardly in opposite directions toward respective ends of said member, said spindle nuts having respective bearing portions in respective ones of said slots, said spindle being rotatable to displace said spindle nuts in opposite directions outwardly for causing downward movement of said pressure member into engagement with the articles stacked in said frame for holding said articles under pressure, a guide formed in said frame comprising a plate member having elongated slots, said spindle nuts including portions extending through respective ones of said slots in alignment with respective spindle nuts, said spindle nuts including portions extending outwardly through said slots, said spindle nuts being of a dimension to be guided by said plate member on each side of said slot during axial movement upon rotation of said spindle.

References Cited by the Examiner

FOREIGN PATENTS 1,017,373   9/52   France.

WALTER A. SCHEEL, *Primary Examiner.*